June 21, 1966  B. J. ARNETT  3,256,971
APPARATUS FOR REGIMENTING ARTICLES
Original Filed March 28, 1960  7 Sheets-Sheet 1
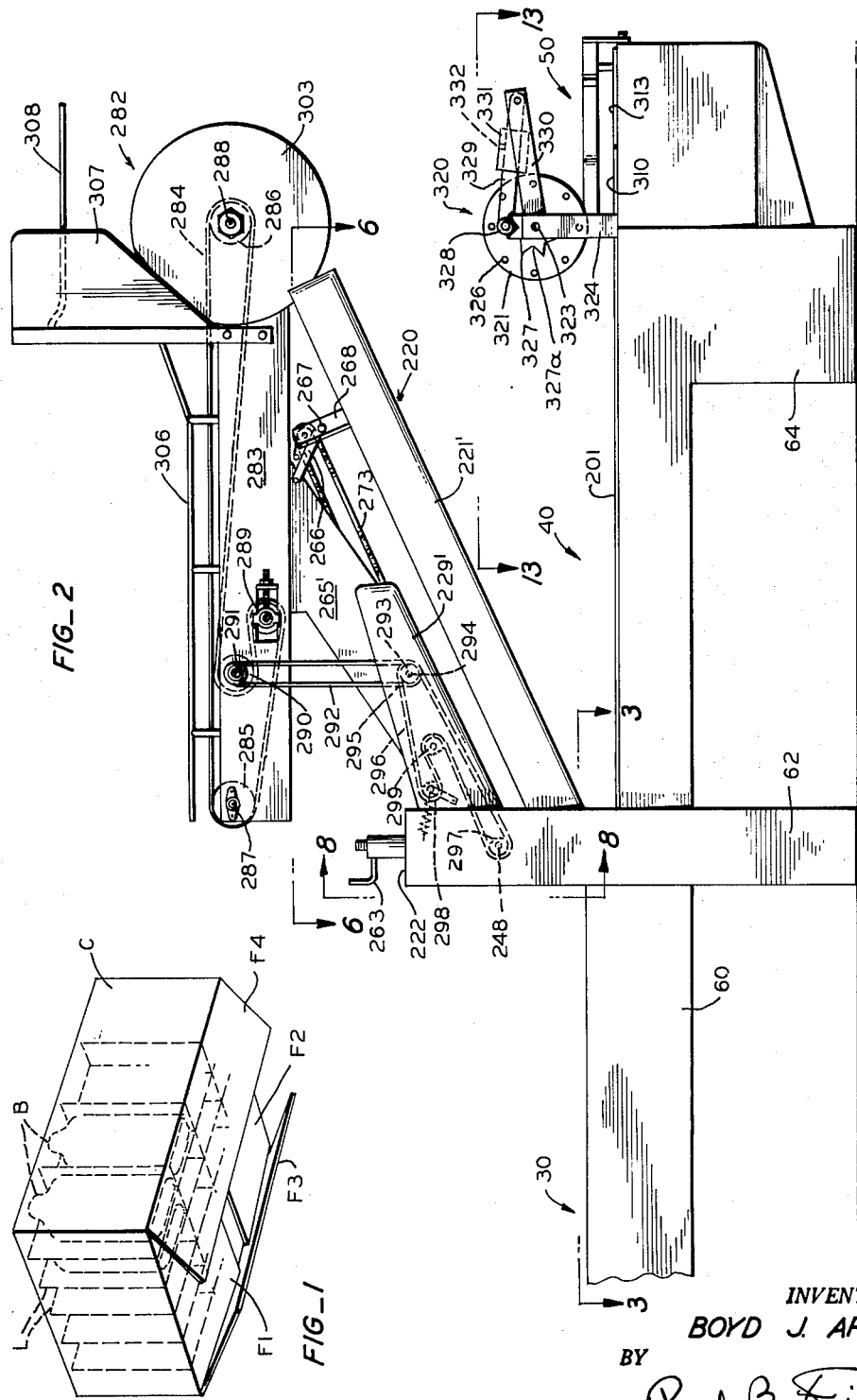
INVENTOR.
BOYD J. ARNETT
BY
Paul B. Fihe
PATENT AGENT

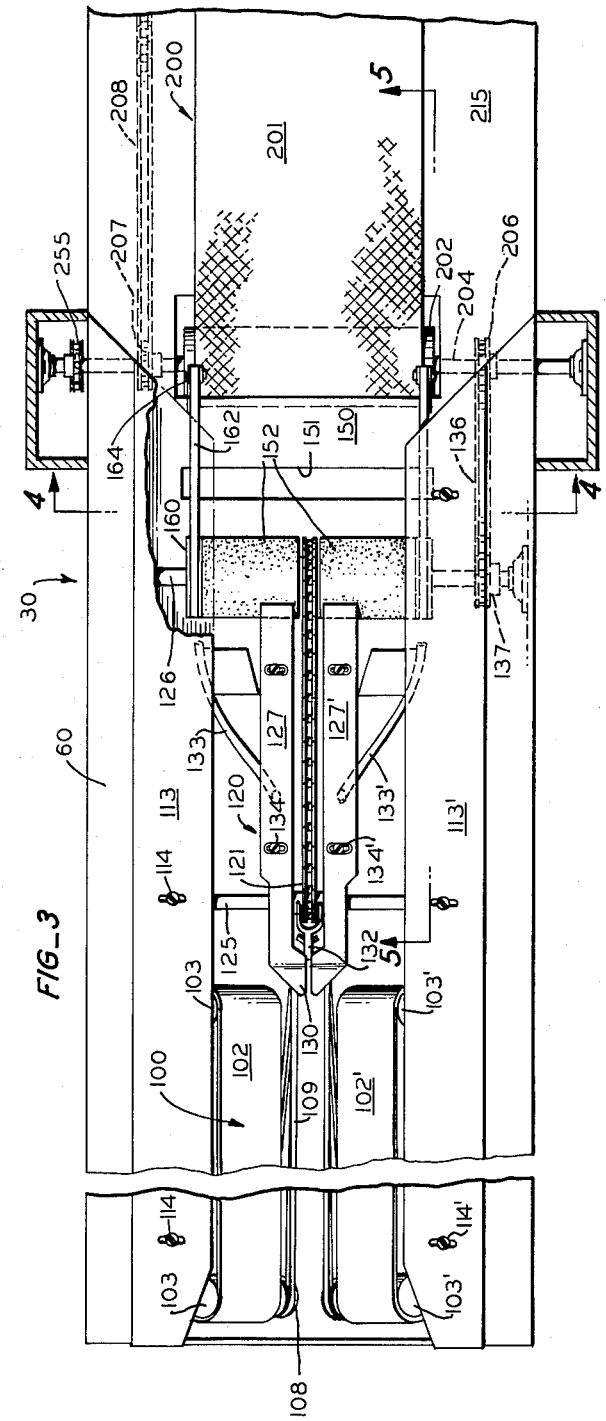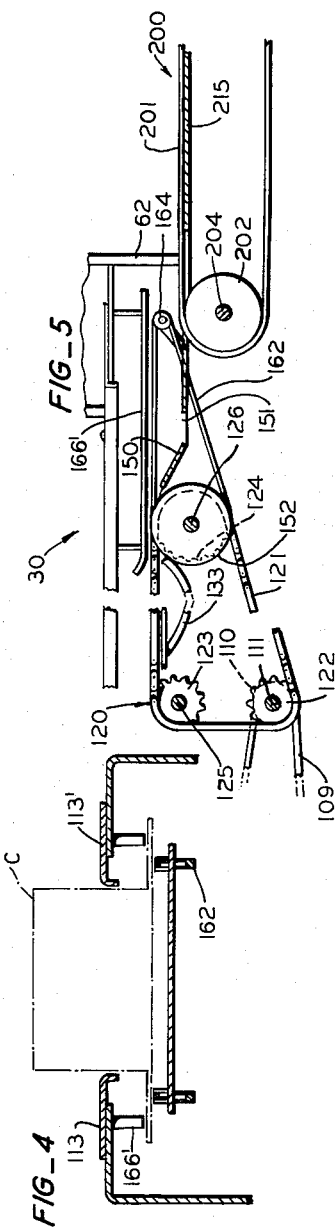

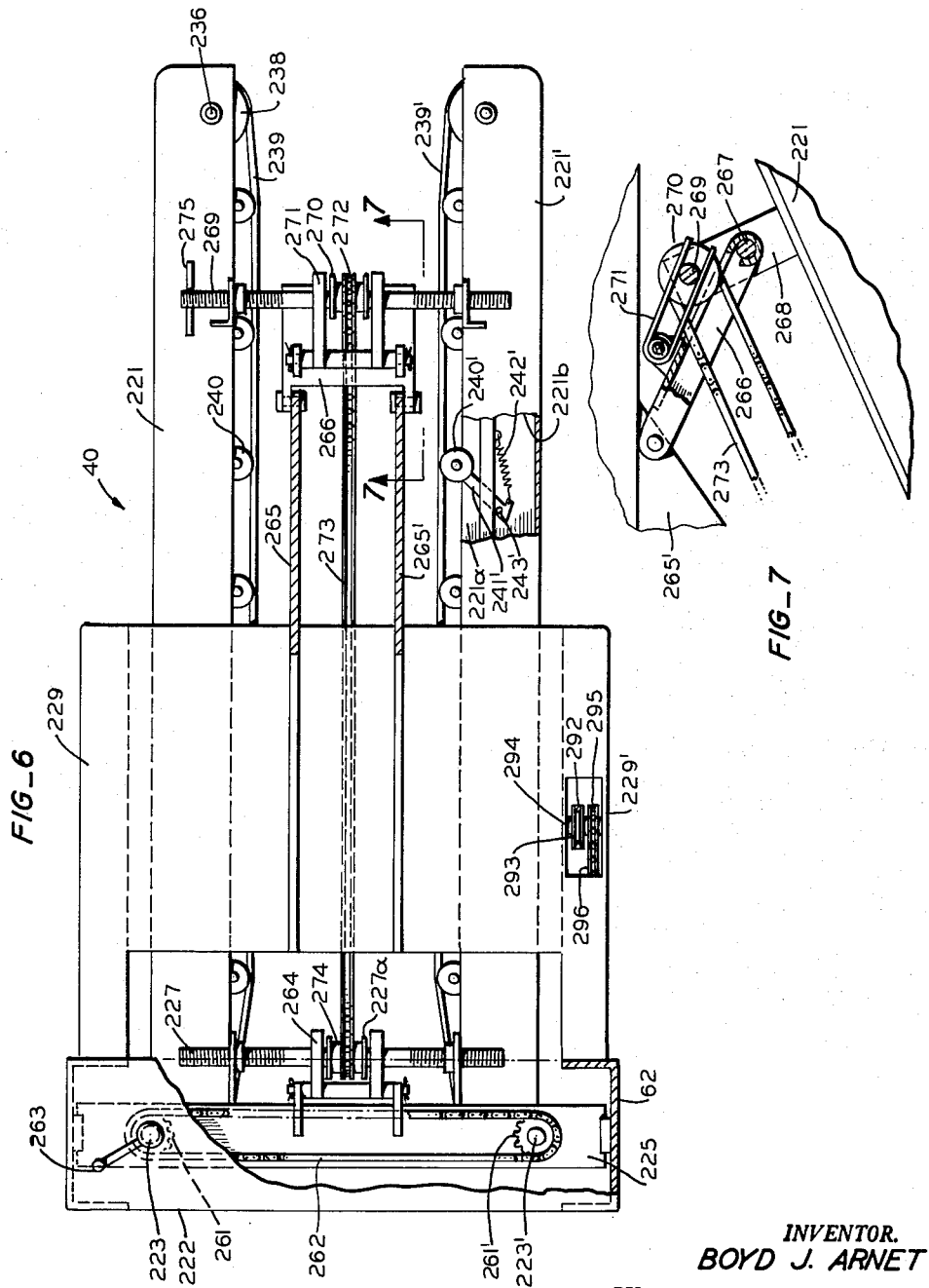

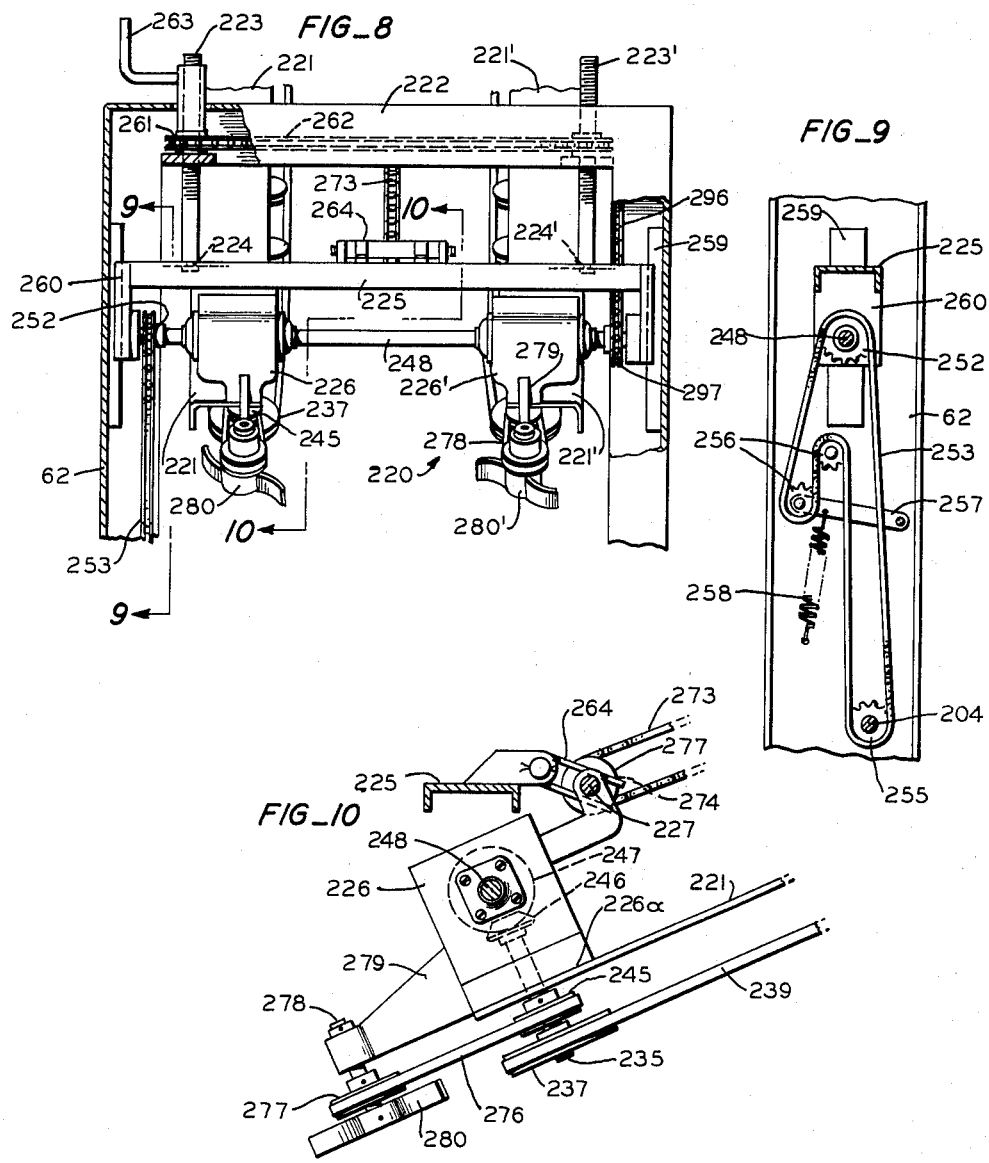

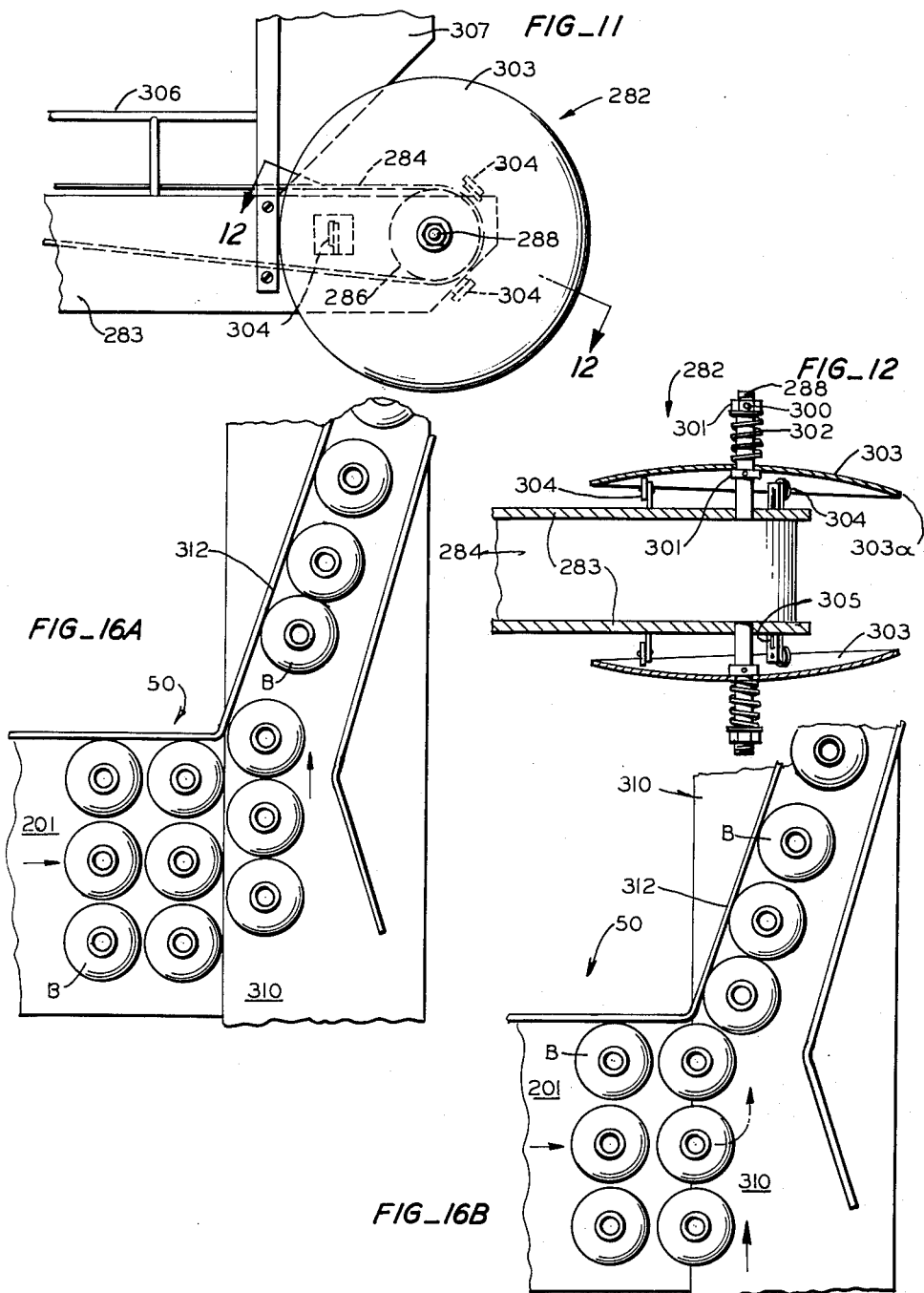

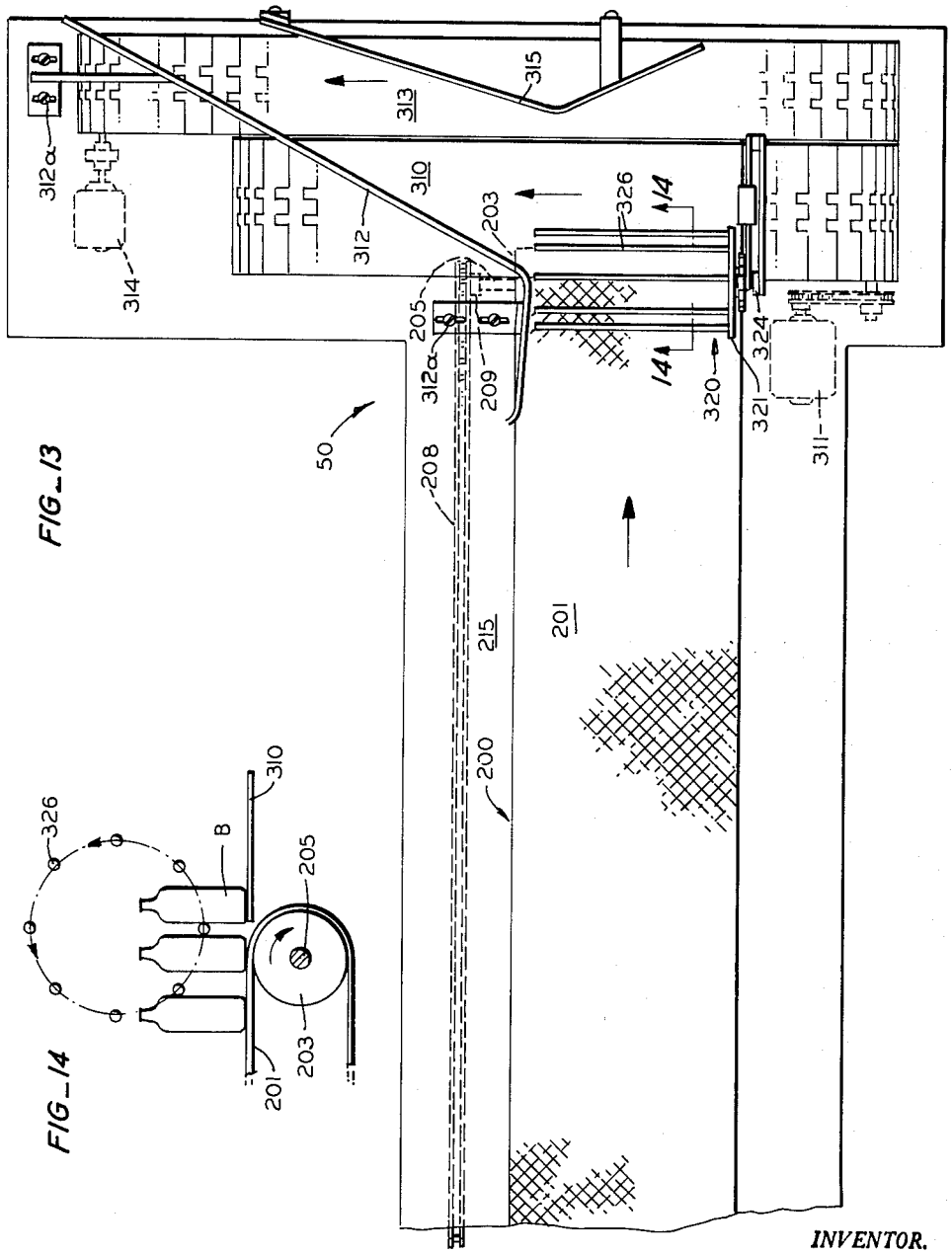

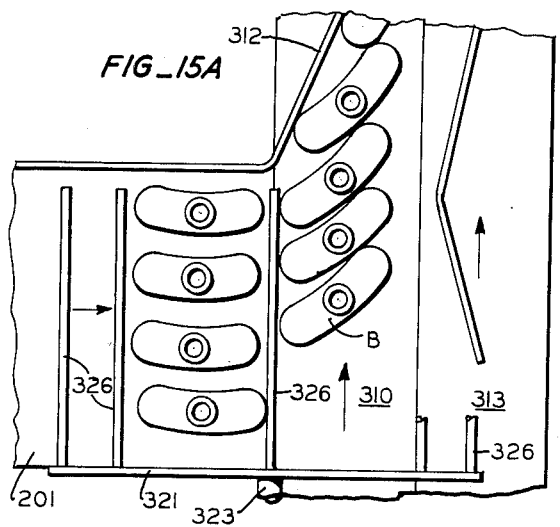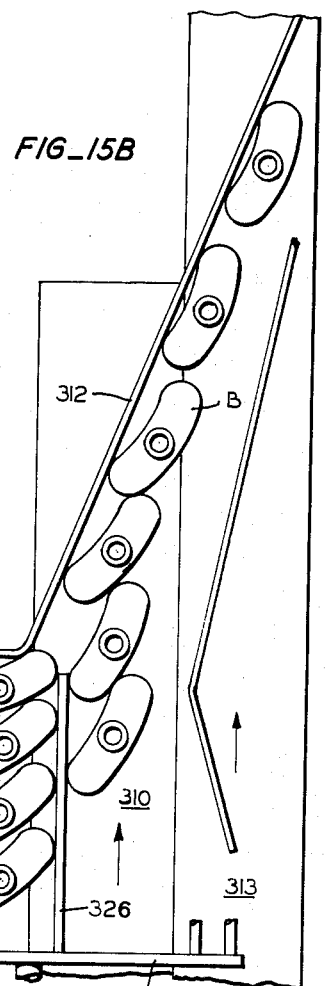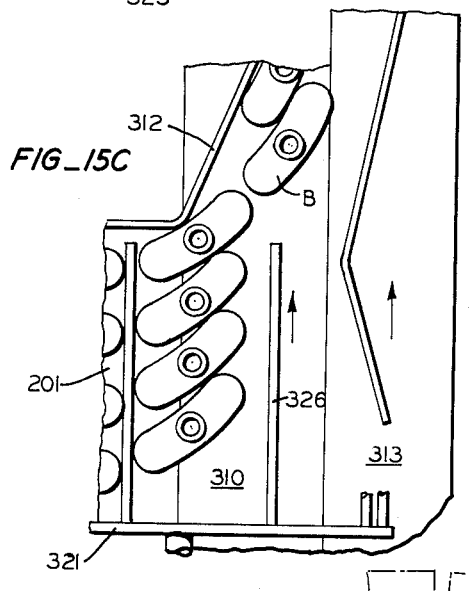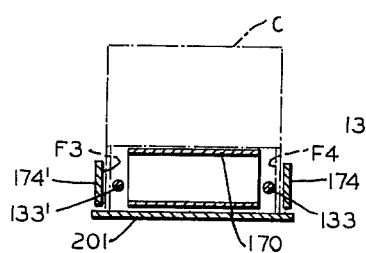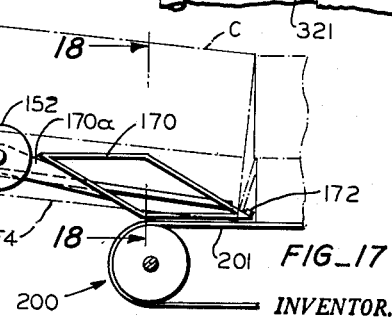

United States Patent Office 3,256,971
Patented June 21, 1966

3,256,971
APPARATUS FOR REGIMENTING ARTICLES
Boyd J. Arnett, 1914 Monroe St., Santa Clara, Calif.;
Lillian F. Arnett, executrix of said Boyd J. Arnett, deceased
Original application Mar. 28, 1960, Ser. No. 18,157. Divided and this application Aug. 6, 1964, Ser. No. 394,371
2 Claims. (Cl. 198—30)

The present invention relates to the art of handling cartons and their contents, and more particularly, to a method of and apparatus for unloading cartons and regimenting the articles unloaded therefrom. The invention is related to that described in my co-pending application, "Method of and Apparatus for Unloading Cartons and Regimenting the Articles Unloaded Therefrom," filed May 4, 1959, under Ser. No. 810,666, now Patent No. 3,179,269. This application is a division of a prior application, Ser. No. 18,157, filed March 28, 1960, which is now abandoned.

Generally, it is an object of the present invention to provide improvements in the method and apparatus described in my previous application, referred to hereinabove, so that greater capacity and effectiveness in the unloading and regimenting of articles can be achieved.

It is a particular feature of the present invention to provide a method and apparatus for unloading articles from cartons in a manner such that structural features of the carton itself are advantageously employed to facilitate an orderly unloading of bottles or other articles therefrom wherefore a subsequent regimenting operation is facilitated.

It is an additional feature of the invention to provide a carton unloading and article regimenting method and apparatus wherein both the cartons and the articles unloaded therefrom are frictionally propelled at relatively high speeds in substantially abutting relation so that high capacity operation is afforded but jamming of cartons or articles is effectively avoided.

Another feature of the invention relates to the provision of a carton unloading and article regimenting method and apparatus wherein such high capacity operation can be achieved with cartons and articles of widely variant shapes and sizes and with equal effectiveness.

It is yet another feature to provide for the discharge of both the emptied cartons and regimented articles in a manner simplifying juncture wth conventional conveyor mechanisms wherefore no interruption of operation or manual handling of the cartons or articles is required.

Yet another feature of the invention is the provision of a method and apparatus for unloading cartons which includes a vibration step through whose incorporation tightly packed articles such as tin cans are effectively loosened and discharged from the carton.

It is a further feature of the invention to provide for the discharge of the articles from cartons in inverted position and subsequent reinversion of the cartons for discharge in upright disposition to a receiving conveyor.

An additional feature is to provide an article regimenting method capable of simply effecting the transfer of grouped articles into single-file relationship.

Yet another feature is the provision of an article regimenting method which provides for direct transfer of a series of successive parallel rows of articles into single-file relation with substantially no gaps in the article file.

These as well as other objects and features of the invention will become more apparent from a perusal of the following description of the method of the present invention as well as the subsequent description of the apparatus illustrated in the accompanying drawings, wherein:

FIG. 1 is a perspective view of an inverted carton and phantom illustration of its interior construction and "flat" glass bottles packed therein, such cartons and bottles being typical of those to which the method and apparatus of the present invention are applicable, FIG. 2 is a side elevational view of the entire apparatus for practicing the method of the present invention and embodying the apparatus features thereof, FIG. 3 is an enlarged fragmentary top plan view of the carton flap-opening section at the left-hand end of the apparatus, as viewed substantially along line 3—3 of FIG. 2, FIG. 4 is a fragmentary, transverse, sectional view taken along line 4—4 of FIG. 3, FIG. 5 is a fragmentary, longitudinal, sectional view taken along line 5—5 of FIG. 3, FIG. 6 is a fragmentary, horizontal, sectional view taken along line 6—6 of FIG. 2, and illustrating the carton-unloading section of the apparatus substantially in plan, FIG. 7 is a fragmentary, vertical, sectional view taken along line 7—7 of FIG. 6, FIG. 8 is a transverse, vertical, sectional view taken along line 8—8 of FIG. 2, and illustrating additional details of the carton-unloading section of the apparatus, FIG. 9 is a fragmentary, sectional view taken substantially along line 9—9 in FIG. 8, FIG. 10 is a broken, fragmentary, sectional view taken substantially along line 10—10 of FIG. 8, FIG. 11 is an enlarged fragmentary view of that portion of the carton-unloading section wherein reinversion of the emptied cartons is achieved, FIG. 12 is a transverse, sectional view taken along line 12—12 of FIG. 11, FIG. 13 is an enlarged fragmentary, horizontal, sectional view taken substantially along line 13—13 of FIG. 2, and illustrating the article regimenting section of the apparatus substantially in plan, FIG. 14 is a fragmentary sectional view taken along line 14—14 of FIG. 13, FIGS. 15A, 15B and 15C are fragmentary top plan diagrammatic views illustrating successive stages of movement of "flat" bottles through the article regimenting section of the apparatus, FIGS. 16A and 16B are views similar to FIGS. 15A, 15B, and 15C illustrating diagrammatically the progression of cylindrical bottles through a slightly simplified form of regimenting mechanism, FIG. 17 is a fragmentary, central, vertical, sectional view similar to FIG. 5, but illustrating a slightly modified form of flap-opening section, and FIG. 18 is a transverse, sectional view taken along line 18—18 of FIG. 17.

To enable greater understanding, the method and apparatus will be described primarily in operative relation to a particular form of carton and article, those shown in FIG. 1. The carton C is of generally rectangular shape and is formed by cardboard sections of sufficient strength to retain the general shape of the carton, but allowing a certain amount of distortion upon application of external forces. The carton C is shown in an inverted position which is that in which it is disposed for instigation of the steps of the method embodying the present invention. In such inverted position, the undersurface of the carton C is formed by four unsealed flaps F1, F2, F3, and F4, the end flaps F1 and F2 being folded thereover to form the outer flaps of the carton undersurface. Normally, all of the flaps have the same dimension between their points of pivotal connection to the carton body and their outer edges.

Contained in the carton C are a plurality of bottles B of generally flat shape and having a reduced neck portion which is formed adjacent its upper end for reception of a suitable closure cap (not shown). The bottles B are packed in the carton in inverted position so that when the carton C is, in turn, inverted, as shown in FIG. 1, the bottles B then rest in an upright position. Since the bottles are of a frangible nature, a honeycomb liner L of cardboard is inserted into the box to form individual compartments for the bottles and preclude contact therebetween and consequent breakage. Normally, this liner L is merely pushed into the carton C and can be manually withdrawn at any time.

In accordance with the method of the present invention, a carton C loaded with the bottles B, after placement in the inverted disposition illustrated in FIG. 1, is caused to undergo the following steps which ultimately result in the separation of the bottles from the carton and subsequent regimenting of the bottles for delivery to a filling station, or the like. It will become clear that other bottles, cans or articles can be unloaded from cartons of variant construction and regimented by the same method steps.

Generally, the carton C, in its inverted disposition is initially moved along a predetermined path while supported on all or portions of its undersurface. During such movement, support of the carton is temporarily transferred to the inner end flaps F1, F2 which remain closed at this time, and the outer side flaps F3, F4 are opened.

Advance of the carton C along its path continues but its support is now transferred to the opened side flaps F3, F4 whereupon the previous support which maintains the inner end flaps F1, F2 in closed disposition can be removed so that they are free to swing open and the articles within the carton are permitted egress therefrom under gravitational force.

In some cases and particularly in that case when light articles, such as tin cans, are packed tightly within the carton, the advancing carton C, while supported on its side flaps, can be vibrated to loosen the articles and thus initiate their gravity-actuated egress from the carton.

The articles in the carton C having thus been loosened, the support for the carton C is transferred from its side flaps F3, F4 to its side walls, which are resiliently grasped. Movement of the carton C continues along its predetermined path, and the grasped carton is gradually lifted as its advances so that the inner end flaps F1, F2, if not already fully opened, can swing to such a position, and the bottles B, or other articles in the carton, can fully emerge from their individual compartments therewithin. Since the bottles B gradually, and therefore gently emerge from the carton C, their aligned and oriented disposition as determined by the containing compartments is preserved.

The bottles B are thereafter frictionally propelled in their upright aligned oriented disposition in a plurality of successive, parallel rows, each row, in turn, arriving at a predetermined position. At such position, each successive row is received and frictionally propelled at an accelerated speed in a direction transverse to the previous direction of row motion so that an aligned, oriented, single-file relationship of the bottles B is achieved. When so regimented into single-file relationship, the bottles B are fed in a suitable fashion, forming no part of the present invention, to a filling station whereat the bottles are, in turn, filled with any desired liquid contents.

While the bottles B are moved first in their row relationship and subsequently in single-file relationship, the cartons C meanwhile have been gradually lifted in their inverted dispositions so as to be entirely free from any contact with the bottles and are thereafter reinverted into an upright disposition for subsequent transfer to a loading station whereat they may receive filled bottles B in a manner forming no part of the present invention.

Such action completes the general method in accordance with the present invention, and it will be noted that a carton C having bottles B or other articles therein as received by the bottler or canner, is handled in a manner so that not only are the bottles unloaded from the cartons and thereafter regimented into single-file relationship, but such bottles are readied for a subsequent filling operation, and the cartons are also readied for subsequent reception of filled bottles. To provide maximum output, the cartons C, while still filled with the bottles B, and the bottles, after unloading, are advanced at substantially the same speeds. In this manner, a series of substantially abutting cartons C are advanced to the unloading position and a series of closely-spaced, parallel rows of bottles are advanced from this unloading position for transfer into regimented single-file relation in a substantially uninterrupted line, as will become more apparent hereinafter.

With such general recitation of the method of the present invention in mind, the individual steps and their ramifications can be more specifically delineated to reduce greater appreciation of the advantages derived through the use of such method. During the initial flap-opening steps, the inverted carton C is frictionally propelled while supported preferably adjacent its outer edges; wherefore the outer side flaps F3, F4 are not only freed, but are actually urged to partially-opened positions. As movement continues, support for the carton C is then transferred to ahe inner end flaps F1, F2, and any exposed bottles B; whereupon frictional propulsion is continued at substantially the same speed while the side flaps F3, F4 are forcibly swung to a positon such that subsequent transfer of support from the undersurface of the closed inner end flaps F1, F2 to the opened side flaps F3, F4 can be effected.

In accordance with one aspect of the invention, the outer side flaps F3, F4 are forcibly swung approximately 180° from their original closed dispositions to substantially horizontal outwardly-projecting dispositions whereupon these side flaps are engaged both above and below and support is transferred from the under surface of the inverted carton C, as defined by the closed end flaps F1, F2 to such outwardly-projecting side flaps. Frictional propulsion at the same speed continues through the engagement with the side flaps F3, F4.

Alternatively, the side flaps F3, F4 are swung only 90° so as to obtain vertically-dependent dispositions whereupon frictional propelling support is transferred to the lowermost edges of the dependent side flaps and their lateral surfaces are engaged and guided to that the dependent dispositions are maintained.

It will be seen that in either instance of transfer of support from the undersurface of the carton C to the opened side flaps F3, F4, the latter have been opened sufficiently to allow subsequently opening of the end flaps F1, F2 and release of the bottles B from within the opened carton. As the support is removed from the undersurface of the carton C to allow opening of the end flaps F1, F2, vibration can be imparted to the main body of the carton while the entire carton is supported and moved through the support of its side flaps F3, F4, thus to initiate initial egress of bottles B or other articles from their compartments within the carton. Preferably, such vibration is in the form of a repeated, controlled beating of the sides of the carton C which is transferred through the liner L to all of the bottles B contained therewithin, and thus provides vibratory loosening of each individual bottle regardless of its position within the carton.

After the described vibratory step has initiated movement of the bottles B or other articles from the carton C, support of the carton is transferred from its side flaps F3, F4 to the side walls of the carton itself. More particularly, the carton C is resiliently grasped on opposite sides, the resilient grasping force being sufficient to slightly displace the side walls of the carton, wherefore the inserted liner L is squeezed therebetween and is thus frictionally held. While such frictional grasping force is maintained, the carton C is gradually lifted as it moves forwardly at the same speed as before so that the bottles B can gradually emerge completely from their compartments and remain on a supporting surface thereunder in aligned, oriented dispositions as determined substantially by their initial placement in the carton compartments.

The unloading of the bottles B from the cartons C having thus been completed, the rows of aligned, oriented bottles are now frictionally propelled on their supported undersurfaces or bases along a continuation of their predetermined path of motion and a substantially the same speed. At a predetermined position along such path, each successive row is received and frictionally propelled substantially at right angles to the previous direction of motion so that as a result of such rectangular change of direction of propulsion, a single-file progression of bottles B results.

The speed of propulsion in such transverse direction is greater than that of the previous row propulsion of the bottles and such increase in speed is adjusted relatively in accordance with the size, shape and number of bottles being handled. This adjustment of the relative speeds of propulsion will be explained in detail hereinafter but the most obvious general condition to be met is that the speed of transverse propulsion is sufficiently great to remove one row of bottles B in time for the reception of the next row so that an accumulation of bottles does not occur. However, it should be noted that as one row of bottles B is moved transversely, the next row continues its forward movement in the original direction of row motion, and the relative speeds of forward and transverse propulsion are adjusted preferably so that the last bottle in one row is followed closely in transverse file relationship by the first bottle in the successive row. Slight lateral displacement of the transversely-moving bottles through engagement by the forwardly moving row of bottles is permitted since the transverse propulsion is frictional and thus permits such displacement, and thus ultimately allows the desired closely-spaced single-file relationship to be established.

As the bottles B in single-file relationship are propelled in the described transverse direction, they, upon reaching a predetermined position, are laterally deflected for eventual delivery to a receiving conveyor or other mechanism for conveyance to a filling machine forming no part of the present invention. Such lateral deflection of the bottles B not only serves to effect delivery to the mentioned receiving conveyor, but assists in achieving perfect alignment and orientation of the single-file bottles upon such delivery. The lateral deflection of the bottles B exerts a frictional force thereon which reduces their component of motion along the direction of transverse frictional propulsion; wherefore any bottle that is not in perfect alignment will not reach the position of lateral deflection in appropriate successive order and thus will be propelled along the direction of transverse propulsion at a speed greater than those bottles which have properly arrived at the lateral deflection position. Thus, such unaligned bottle B will tend to push its way between two bottles already disposed in the lateral deflecting position and gradually be moved therebetween, if being remembered that the bottles are propelled only frictionally and thus can adjust their dispositions as a result of externally applied forces.

While the lateral deflection accommodates and corrects readily any misalignment or improper orientation in a row of bottles B of cylindrical, square, or other regular configuration; the problem of correcting such erroneous dispositions is somewhat aggravated if bottles such as the so-called "flat" bottles illustrated in FIG. 1 are to be handled. When handling such "flat" bottles B, preferably the progress of each successive row of bottles along the initial direction of motion is resiliently impeded prior to its subsequent transverse propulsion. The resilient impeding force applied is relatively slight, being greater than the frictional propelling force exerted on one or two bottles B, but less than the summation of the frictional force on a complete row of bottles. Thus, one bottle B will be temporarily restrained against further movement until lateral alignment of the entire row is attained; whereupon, the entire row of bottles will move forwardly in precise alignment for reception and transverse propulsion in single-file relation.

An additional problem is encountered with "flat" bottles B, particularly as disposed in the carton as illustrated in FIG. 1. Under such condition, the unloading of the bottles will result in a series of successive parallel rows of bottles, each of which has a dimension transverse to the direction of bottle row movement that is considerably less than its dimension in the direction of bottle row movement. Since, as each bottle B moves forwardly to the position where it is to be frictionally propelled in a transverse direction, its leading edge will be initially propelled in this transverse direction so that the flat bottle will be turned and will eventually arrive at a disposition more closely aligned with the direction of transverse motion. Since, each flat bottle B is thus turned, but the spacing between it and the immediately adjacent bottles B remains substantially the same, an overlap of the bottles will be experienced.

In order to eliminate this overlap and thus achieve finally an oriented, aligned, single-file relationship of such "flat" bottles, the bottles B are not only laterally deflected in the manner previously described, but are exposed to a frictional propulsion at a higher rate of speed prior to delivery to the hereinabove mentioned receiving conveyor. Thus, during the lateral deflection each bottle B is, at a predetermined position, accelerated so as to be separated from a successive overlapping bottle, since the latter continues to move at a relatively slower speed. This separation of overlapping bottles B assures attainment of the desired single-file relationship. Thus, it will be seen that the method can, with but slight variation, be utilized to handle bottles of variant size and shape and assures an effective unloading and regimenting of such bottles into desired single-file relationship for delivery to a filling machine or the like.

In order to prepare the cartons C for subsequent reloading, each carton, which has been resiliently grasped and gradually lifted to a position free from contact with the unloaded bottles, is, in turn, resiliently grasped on its sides while still in inverted disposition and reinverted to an upright disposition. The carton C is then released onto an appropriate receiving conveyor which will, of course, deliver the carton to a loading station.

In accordance with additional aspects of the present invention, the described method can be carried out with the apparatus shown in the accompanying drawings. Such apparatus, as shown best in FIG. 2, is only approximately 15 feet in length, 4 feet in width, and 7 feet in overall height, but is capable of unloading cartons of widely varying dimensions and subsequently regimenting the unloaded articles also of variant shapes and sizes at rates above 300 articles per minute so as to provide more than adequate capacity for any commercially-available filling machine.

For purposes of explanation, the entire apparatus, as shown in FIG. 2, will be described in sections, each of which performs certain steps of the previously described method, such sections being shown in greater detail in additional figures of the drawings. Generally, the first section constitutes the flap-opening section 30 wherein the inverted carton C is propelled while the two side flaps F3 and F4 are opened. Support is then transferred to these side flaps F3, F4 and the end flaps F1 and F2 are released. Thereafter, the carton C is delivered to the actual unloading section 40 wherein the carton C, while still supported on its side flaps F3, F4, is first vibrated and then laterally grasped and lifted to allow complete egress of the bottles B therefrom into aligned, oriented dispositions. From this unloading section 40, the bottles B continue to the regimenting section 50 wherein they are ultimately placed into aligned, single-file relationship for delivery to a filling machine (not shown) while the carton C is moved along an upwardly deviant path and is then reinverted and delivered to a carton-receiving conveyor or storage area, as required.

As shown most clearly in FIG. 2, the entire apparatus is mounted on a unitary table like frame structure, including a pair of horizontally disposed parallel frame members 60 which form the top of the table and which are carried at a convenient height by spaced pairs of upright legs or standards 62, 64. The unloading section 40, being intermediate, is disposed between the pairs of spaced legs 62, 64, while the flap-opening and regimenting sections 30 and 50 project from opposite ends thereof for easy access by the operator. Preferably, the horizontally-extending table frame members 60 are channel members which generally support therebetween a series of conveyors for moving cartons C and the bottles B or other articles generally from the left to the right, as viewed in FIG. 2. The legs 62, 64 are also formed by channel members and one pair of legs 62 projects above the level of the horizontally-extending frame members 60 and supports in upwardly inclined disposition, a carton take-off conveyor and reinversion mechanism, to be described hereinafter. Both the frame members 60 and legs 62, 64 are joined at intervals by suitable transverse frame members which maintain rigidly their described disposition.

FLAP-OPENING SECTION 30

With additional reference to FIGS. 3, 4, and 5, the flap-opening section 30 of the device is supported by and between the projecting portion of channel members 60 and includes suitable means to conduct the cartons through this first section to the actual carton unloading section 40. The arrangement of the flap-opening section 30 is substantially identical with the side flap-opening section of my previously referred to patent application, Ser. No. 810,666, now Patent No. 3,179,269, to which reference can be made for additional details of construction and operation. Each carton C that has traversed the flap-opening section 30 is delivered to the unloading section 40 of the apparatus with both side flaps F3, F4 opened and the inner end flaps F1, F2 released in preparation for the actual unloading operation.

The flap-opening section 30 includes a first conveyor 100 that is generally V-shaped in cross section so as to support an inverted carton C at its side edges and permit the outer side flaps F3, F4 to swing partially open. This conveyor 100 is formed by two flat endless belts 102, 102' disposed in mirror image relationship on opposite sides of a central vertical plane extending along the direction of carton movement and substantially bisecting the flap-opening section 30, as viewed in FIG. 3. Since the two belts 102, 102', forming the first conveyor 100, are arranged in such mirror image relationship, only one belt 102 and the elements associated therewith will be described, and like numerals will be employed to designate similar parts associated with the other belt 102 but with an added prime notation to enable differentiation. The endless belt 102 is supported for movement on rollers 103 spaced in the direction of carton motion, each roller being mounted on a suitable shaft (not shown) extending outwardly from the mentioned central plane and upwardly therefrom at a predetermined angle wherefore in a direction transverse to carton movement, the upper flight of the belt 102 is disposed upwardly and outwardly from such central plane. Preferably, the belt 102 has a rubber surface so as to provide considerable frictional engagement with the supported carton C to assure firm propulsion thereof.

The belt rollers 103 are adjustably supported from the channel members 60 in a manner described in detail in my referred-to prior application so that the belt 102 can be vertically adjusted to enable accommodation of cartons of various dimensions, as will become apparent hereinafter.

In order to achieve movement of the conveyor belt 102 and effect the desired carton conveyance, the shaft of one roller 103 has a pulley 108 mounted thereon over which is trained an endless V-belt 109 which in turn is operably engaged at its remote end with a suitable pulley 110 (FIG. 5) on a shaft 111 of a second endless conveyor 120 to be described hereinafter.

Guide rails 113, 113' are mounted above the previously described channel members 60 forming the frame and are connected thereto by slotted connections shown at 114, 114'; wherefore such guide rails can be adjusted inwardly or outwardly from the described central plane so as to closely accommodate therebetween the received carton C. Since a carton C is laterally aligned by these guide rails 113, 113', it will be supported centrally on the V-shaped first conveyor 100 and thus be retained in its desired horizontal disposition as it moves along such conveyor. The first conveyor 100 is sufficiently long so that for any length of carton C which is to be accommodated, each carton will rest entirely thereon before moving onto the mentioned second conveyor 120. Consequently, the side flaps F3, F4 of such supported carton C can swing in a partially opened disposition at this position of travel through the flap-opening section 30 of the apparatus. Actually, since the carton C is supported at its outer edges where the outer side flaps F3, F4 pivotally join the body portion of the carton, the side flaps are urged into such partially opened disposition by frictional engagement with the belts 102, 102'. Thus, this first conveyor 100 not only permits the side flaps F3, F4' of the carton C to open, but is actually arranged to instigate such flap opening.

As previously stated, the first conveyor 100 is sufficiently long to accommodate any carton C which it is desired to handle. On the other hand, if a carton C of greater width is to be handled, the guide rails 113, 113' are adjusted outwardly the required amount; such adjustment being made with care to assure that each side rail is the same distance from the described central, longitudinal plane. Thereafter, each belt 102, 102' is lowered an equal amount such that the carton of greater width placed thereon will be disposed at the same horizontal level on the conveyor 100. Practical limits obviously exist relative to the size of the carton C which can be handled by the apparatus shown in the drawings, but it is obvious that no theoretical limitation exists whatsoever.

From the exit end of the first conveyor 100, the mentioned second conveyor 120 extends longitudinally of the apparatus a distance also somewhat in excess of the longest carton C to be handled by the apparatus. The second conveyor 120 preferably takes the form of an endless roller chain 121 trained about two horizontally spaced sprockets 123, 124 mounted on two parallel shafts 125, 126 as shown in FIG. 3 so as to lie substantially in the previously described central plane and with its upper flight between the mentioned sprockets in the same plane as the undersurface of a carton C received from the first conveyor 100. The endless roller chain 121 is also trained about a third sprocket 122 (FIG. 5) thereunder mounted on the previously mentioned shaft 111 which also mounts the pulley 110 establishing driving connection through the belt 109 to the pulley 108 of the first conveyor 100. The connection between the first conveyor 100 and the second conveyor 120 is such that a carton C previously propelled at a predetermined speed by frictional engagement at its outer edges with the angularly disposed belts 102, 102' of the first conveyor 100, is now grasped at the middle of its undersurface by the roller chain 121 and frictionally propelled at substantially the same speed and at the same level along a continuation of its previous path of travel.

Sliding support of a carton C propelled by the conveyor chain 121 is provided by a pair of similar horizontal plates 127, 127' disposed in mirror image relationship on opposite sides of the conveyor chain 121 at a level just slightly beneath that of its upper flight. At their ends which project beyond the entrance end of the second conveyor 120, these plates 127, 127' decline slightly and are tapered to form the pointed end of a side-flap opening plow, generally indicated at 130. The pointed end of the plow 130 is disposed so it is passed below the undersurface of the inverted carton C but above the partially opened side flaps F3, F4 thereof as this carton moves from the first conveyor 100 onto the second conveyor 120, wherefore carton support is transferred from the side edges of the carton to the inner end flaps F1, F2 thereof. A vertically-disposed divider 132 encompasses the end of the roller chain 121 so that no flap engagement with the chain can be experienced. At a distance approximately equal to a carton's length from the pointed end of the plow 130, rods 133, 133' are connected to the undersurface of the respective plates 127, 127'. Each rod 133, or 133', is generally of helical configuration extending downwardly, outwardly and thence upwardly again, its precise configuration being such that a side flap F3, or F4, already partially opened will be engaged and thence swung 180° into a fully opened or substantially horizontal outwardly projecting disposition as the carton C moves along the second conveyor 120 toward the exit end thereof.

As has been briefly mentioned, the second conveyor 120, like the first, is sufficiently long to accommodate any size carton C less than a predetermined length. More particularly, this second conveyor 120 has an overall length equal to that of a predetermined carton C plus the additional length of the helical flap opening rods 133, 133'. To provide for variations in carton width, the guide rails 113, 113' which extend along the outer sides of the first conveyor 100 continue along the outer sides of the second conveyor 120 to maintain carton alignment and are laterally adjustable in the manner hereinabove described. Since cartons C of different widths also have side flaps F3, F4 of different dimensions, plow 130 is adjustable to provide for proper opening of the various flap sizes. For this purpose, the two plates 127, 127' are mounted on the frame by slotted connections 134, 134' wherefore each can be individually adjusted laterally relative to the central plane wherein the second conveyor 120 lies. Since the helical rods 133, 133' are mounted on the plates 127, 127', they, also, are adjusted laterally when the plates themselves are moved. For a carton C of greater width and thus having larger side flaps F3, F4, these plates 127, 127' and the rods 133, 133' mounted thereon, are adjusted outwardly from such central plane.

In order to drive the second conveyor 120, a drive chain 136 is connected between a sprocket 137 on its forward shaft 126 and another sprocket 206 on one shaft 204 of a third conveyor 200 which forms part of the carton unloading section 40. This drive to the second conveyor 120 is, in turn, transferred to the first conveyor 100 by the previously described V-belts 109 and pulleys 108, 110. As will be described in detail hereinafter, the third conveyor 200 is driven in a suitable manner wherefore it will be seen that the first, second, and third conveyors 100, 120, 200 partake of correlated movement, all at substantially the same linear speed.

After a carton C has passed over the first and second conveyors 110, 120, and both side flaps F3, F4 have been opened, it is necessary to remove support from the inner end flaps F1, F2 of the carton so that they may open and permit egress of the bottles B. In order to effect such release of the inner end flaps F1, F2, and move the carton C towards the mentioned third conveyor 200, a pair of frictional surface rollers 152 are mounted on the transverse shaft 126 which, in turn, supports the forward sprocket 124 of the second conveyor 120. These rollers 152 mounted on opposite sides of the conveyor 120 are of slightly greater diameter than the chain sprocket 124 so that a carton C with its side flaps F3, F4 opened will be engaged by such rollers, lifted from engagement by the central conveyor chain 121, and firmly propelled at a slightly higher speed, thus assuring attainment of abutting relation with a preceding carton C to enable effective regimenting of the unloaded bottles B, as will become apparent hereinafter. At the outer ends of the described rollers 152 remote from the centrally disposed roller chain 121, a pair of pulleys 160 are also mounted on the transverse shaft 126. A belt 162 is trained on each of these pulleys and another pulley 164 closely adjacent the mentioned third conveyor 200 at a disposition so that the upper flight of the belt is in a horizontal plane substantially level with the top of the described rollers 152 and is disposed outwardly of the vertical side walls of an advancing carton C. Thus, these belts 162 engage the undersurface of the horizontally-projecting side flaps F3, F4 of a carton C received from the second conveyor 120. A flat plate 166 is rigidly mounted a spaced distance above each of these pulley belts 162 so as to engage the upper surface of a side flap F3 or F4 whose undersurface is carried by the belt wherefore the horizontal disposition of the side flaps is maintained and support for the entire carton C and its contents is thus transferred gradually to the side flaps as the undersurface of the carton, as defined by its end flaps F1, F2 leaves the second conveyor 120 and the frictional rollers 152. The carton C is frictionally propelled through the contact between its side flaps F3, F4 and the belts 162 but slippage or lateral displacement is permitted thereon.

Between the described belts 162 which support the carton C through contact with its projecting side flaps F3, F4 and frictionally propel the same towards the third conveyor 200, a plate 150 is supported from the frame to slope downwardly from the described frictional rollers 152 and a transverse slot 151 is formed in such plate to receive the trailing end flap F2 of a carton C as the same passes thereover, and to swing this trailing end flap into fully opened position. Beyond the slot 151, the plate 150 continues in substantially a horizontal plane to the third conveyor 200, whose upper flight is also in this same horizontal plane and thus is somewhat lower than the plane of carton support on the first and second conveyors 100, 120, as clearly shown in FIG. 5.

The dimensions of the rollers 152, the endless belts 162, the underlying plate 150, and the slot 151 therein are such that any carton C which can be accommodated by the first and second conveyors 100, 120 is, in turn hereby accommodated without the necessity of any adjustment. The overall length of the side flap supporting belts 162 is sufficiently great so that a carton C can be substantially entirely supported thereby during its movement from the second conveyor 120 to the third conveyor 200 for a purpose to become apparent hereinafter in the actual description of the carton unloading section 40.

Since a carton C is supported by its side flaps F3, F4 on the belts 152 and is moved forwardly substantially in the original plane of carton motion over the first and second conveyors 100, 120, not only is the trailing end flap F2 of the carton forcibly opened through its described contact with the slot 151, but the leading end flap F1 of the carton can also swing partially open and bottles B or other articles in the carton are thus freed for partial egress from the carton C. Consequently, at this point in its advance through the apparatus, the carton C has been readied for entry into the carton unloading section 40 of the apparatus. It will be apparent that the steps of the general method hereinbefore described for opening the side flaps F3, F4, releasing the end flaps F1, F2 and otherwise preparing the carton for the actual unloading operation can be embodied in the apparatus other than that described hereinabove with reference particularly to FIGS. 3, 4, and 5. One such modified apparatus is illustrated in FIGS. 17 and 18 in which the side flaps F3, F4 are opened only 90° so as to be in a dependent disposition and support is transferred from the undersurface of the carton C to such dependent side flaps. The end flaps F1, F2 are then released in preparation for carton entry into the actual unloading section 40 of the apparatus.

More particular, this modified apparatus includes a first conveyor 100 which is identical with that shown in FIGS. 3, 4, and 5, and functions in the same manner to effect partial opening of the side flaps F3, F4. A second conveyor 120 is also substantially identical with that disclosed in FIGS. 3, 4, and 5, incorporating a side-flap opening plow 130 and helical rods 133, 133' which latter however are of a configuration such as to urge the side flaps F3, F4 only to a vertically-dependent disposition, as clearly illustrated in FIG. 18.

Frictional rollers 152 are rotatably supported at the exit end of the second conveyor 120 as in the case of the previously described flap-opening section, but the endless belts 162 which support the horizontally-projecting flaps in such previously described embodiment of this section are eliminated. A plate 170 is centrally supported as shown at 170a to extend forwardly from the described rollers 152 in the direction of carton motion, first horizontally at a level above the third conveyor 200 a distance slightly less than the dependent dimension of a side flap F3 or F4 and thereafter downwardly to terminate immediately above the third conveyor 200 as shown clearly in FIG. 17. The width of this plate 170 is slightly less than the transverse dimension of an advancing carton C so that the undersurface of the carton is propelled through its frictional engagement by the rollers 152 onto such plate and the dependent side flaps F3, F4 move into contact with the third conveyor 200. The vertical dependent disposition of the open side flaps F3, F4 is maintained by extension of the helical rods 133, 133' interiorly of the flaps and guide rail 174, 174' which maintain sliding contact with the outer surface of the dependent side flaps F3, F4, as shown in FIG. 18.

As a carton C is propelled by the frictional rollers 152 over the rigid plate 170, its forward portion first moves across the horizontal section of the plate so that the lower edges of the dependent side flaps come into engagement with the third conveyor 200 before its rearward portion leaves the rollers. In other words, the position of the third conveyor 200 relative to the rollers 152 is such that the carton C is in propelling engagement with either the rollers or the third conveyor at all times so that no interruption of carton propulsion occurs. However, since the rollers 152 advance a carton C at a slightly higher speed than the third conveyor 200, as previously mentioned, any carton separation is eliminated and abutting relation as shown in FIG. 17 is assured.

As the carton C moves over the downwardly inclined section of the plate 170 with the side flaps F3, F4 supporting the same on the third conveyor 200, the forward end flap F1 of the carton can begin to swing open under its own gravitational force and that of the bottles B or other articles within the carton pressing thereagainst. As the latter portion of the carton also moves down this slope, the rear end flap F2 can also swing towards an open position To assist the rear-flap opening, a finger 172 is secured to the downwardly-inclined section of the rigid plate 170 to project upwardly and thus engage and forcibly pull the rear flap F2 to fully-opened disposition as the carton advances, as clearly illustrated in FIG. 17. Since, as has been previously mentioned, the side flaps F3, F4 and end flaps F1, F2 of a carton C have the same dimension from their points of pivotal connection to the body of the carton to their outermost edges, upon completion of the transfer across the intervening plate 170, all flaps F1, F2, F3 and F4 of the carton are in fully dependent dispositions and serve to guide the articles from their compartments within the carton into aligned positions on the third conveyor 200 thereunder during the actual unloading operation in the carton unloading section 40, now to be described.

CARTON UNLOADING SECTION 40

With additional reference to FIGS. 6 through 13 of the drawings, the carton unloading section 40 of the apparatus includes the mentioned third conveyor 200 which is formed by a woven wire endless belt 201 trained about parallel rollers 202, 203 (see FIGS. 5 and 13) at the opposite ends of the carton unloading section. These rollers 202, 203 are rotatably supported respectively on shafts 204, 205 mounted in suitable bearings on the channel members 60 forming the longitudinal frame of the apparatus. The shaft 204, which as previously mentioned, carries a sprocket 206 enabling connection to the second conveyor 120, also carries a second sprocket 207 (see FIG. 3) from which a sprocket chain 208 extends to a similar sprocket 209 on the remote roller shaft 205 (see FIG. 13). From this latter roller shaft 205, drive connection is made to the drive shaft of a conventional continuously variable speed drive unit (not shown) that includes an electric motor of requisite horsepower.

A rigid metal plate 215 is supported between the frame channel members 60 to, in turn, support the upper flight of the woven wire belt 201 as the same moves from the entrance to the exit end of the carton unloading section 40. The surface character of this woven wire belt 201 is such that a predetermined frictional propelling force is applied to an article placed thereon. More specifically, a bottle B placed on the moving belt 201 will be frictionally moved or propelled thereby but exterior forces can be applied to the bottle to restrain its movement with the belt or to shift the bottle laterally when such restraint or lateral shifting is required for purposes such as those to be described hereinafter.

As previously mentioned, the carton unloading section 40 also includes a carton take-off conveyor 220 that generally is arranged to grasp the sides of a previously opened and inverted carton C at the entrance end of the unloading section and gradually lift such carton from the surface of the belt conveyor 200 while leaving the bottles on such belt conveyor for subsequent conveyance to the regimenting section 50.

With particular reference to FIGS. 6 through 10, the carton take-off conveyor 220 includes a pair of arms 221, 221' that project in parallel relation and are inclined upwardly in the direction of movement of the carton C and bottles B, such arms serving as direct supports for the actual carton grasping and conveying elements. Both the arms 221, 221' and the elements supported therefrom are arranged in mirror image relationship on opposite sides of the aforementioned central vertical plane wherefore the following detailed description is limited to half of the structure and like parts of the other half will be indicated by like numerals with an added prime notation.

To suspend the arms 221, 221', a transverse frame member 222 is rigidly connected in bridging relation between the upper extremities of the upwardly projecting legs or standards 62 at the entrance end of the unloading section 40, as best shown in FIGS. 2 and 8. From laterally spaced points on this frame member 22, threaded studs 223 pass through vertically threaded bores therein and project downwardly to suspend at their lower ends by pivotal connections 224 a transversely extending channel member 225 at whose opposite extremities are formed guides 260 which slidably engage vertical tracks 259 on the upright legs 62 of the apparatus. The laterally spaced studs 223, each carry a small sprocket 261, about which sprockets are trained an endless sprocket chain 262 so that any rotation of one stud is immediately and synchronously transferred to the other. A crank 263 is secured to the upper extremity of one of the studs 223 to enable manual turning of both studs through the described sprocket chain connection and ultimately effect a vertical lowering or raising of the channel member 225.

Hollow brackets 226 are mounted for slidable adjustment on a shaft 248 that is mounted in bearings on the described guides 260 to extend transversely with respect to the longitudinal direction of carton movement through the apparatus and one of each arm 221 is rigidly secured, as indicated at 226A in FIG. 10, to a respective one of these brackets 226. It will be clear that both arms 221 and 221' can be adjusted laterally of the machine through sliding of these brackets 226 on the transversely extending shaft 248, and vertical adjustment can be accomplished through mere turning of the adjustment studs 223 which, in turn, suspend the transverse channel member 225 and shaft 248 from the rigid frame member 222. To enable the mentioned lateral adjustment, an adjustment screw 227 is threadedly connected to the brackets 226 at its opposite ends as shown best in FIGS. 6 and 10, the threads of such adjustment screw being of equal but opposite pitch at its respective ends so that rotation of the screw will cause the two brackets 226, 226' to move together or apart as the case may be. To insure equal lateral spacing of the arms 221, 221', relative to the central plane through the apparatus, a retaining yoke 264 is pivotally supported from the channel member 225 to straddle collars 227a fixed on the adjustment screw 227.

The projecting arms 221, 221' are also suspended for vertical and/or horizontal adjustment at another position that is spaced from the vertical legs 62. For this purpose, a pair of braces 229 are rigidly attached adjacent the upper end of the legs 62 to project in substantial parallelism above the channel members 60 of the main frame and support rigidly parallel vertical plates 265 which extend forwardly and upwardly therefrom. A suspension bracket 266 is pivotally mounted adjacent the projecting end of these plates 265 and at its remote end is pivotally secured on a bar 267 extending between upwardly projecting brackets 268 on the arms 221, 221'. Another adjustment screw 269, similar to that previously described with opposite thread pitches at its opposite ends, passes through appropriately threaded openings in such brackets 268 at a position above the described bar 267, as most clearly shown in FIG. 7. Collars 270 on this second adjustment screw 269 are also engaged by a retaining yoke 271 pivotally supported from the described suspension bracket 266. The adjustment screw 268 mounts between the collars 270 a sprocket 272 about which is trained a sprocket chain 273 which extends longitudinally between the two projecting arms 221, 221' so that it may be trained about a like sprocket 274 on the previously described adjustment screw 227 so that like lateral adjustment of the remote ends of the arms 221, 221' will be obtained. To enable such lateral adjustment, a suitable handle 275 is placed on the end of the adjustment screw 269.

The mentioned arms 221, 221' are channel members and, as can best be visualized by reference to FIGS. 6 and 8, the flanges 221a, 221b of the channel are directed inwardly. Adjacent opposite ends of one arm 221, shafts 235, 236 project between the channel flanges 221a, 221b and carry pulleys 237, 238, each of whose diameter is sufficiently great so that a portion of its circumference projects inwardly beyond the inwardly directed flanges of the channel member a small amount. An endless V belt 239 is trained about these pulleys 237, 238 so that its inner flight extends substantially the full length of the arm 221 and is, at a plurality of positions, spring-urged further inwardly by engagement with a number of like idler pulleys 240 of smaller diameter, each of which is mounted for free rotation at one end of a pivotally supported lever arm 241, whose other end is connected to a spring 242 that is tensioned between this end of the lever arm and a rigid pin 243 on the arm 221, as best shown in FIG. 6. When supported as described and urged inwardly by the plurality of spring-urged idler pulleys 240, 240', the inner flights of the belts 239, 239' on the opposite, but parallel arms 221, 221', normally take the disposition shown in FIG. 6 whereat the space between the inner belt flights is slightly less than the width of the carton C to be handled by the apparatus, but as a carton is grasped and moved between the belt flights, the individual pulleys 240, in turn, can shift outwardly against the urgency of their respective springs 242 to permit passage of the carton but maintain a constant resilient grasping force thereagainst.

As shown best in FIGS. 8 and 10, a second pulley 245 is mounted on the shaft 235 adjacent the described V belt pulley 237 at the entrance end of the unloading section. A short drive belt 276 is trained about the pulley 245 and another pulley 277 mounted on a stub shaft 278, rotatably supported to extend downwardly from a bracket 279 projecting from the end of the arm 221 and thus opposite to the direction of carton motion. At the lower extremity of each stub shaft 278, a beater member 280 consisting of a hub and two projecting blades, preferably of rubber or other resilient material, is mounted, its disposition being such that the ends of the resilient blades engage, in a vibratory fashion, the sides of a carton C before the same has been grasped by the endless V belts 239. More particularly, the sides of the carton C are vibrated while the carton, itself, is supported from its side flaps F3, F4 in the manner previously described.

In order to drive the described beaters 280 and the carton conveying V belts 239 as well, the pulley-supporting shaft 235 at the entrance end of the unloading section 40 carries a bevel gear 246 at its upper end which, in turn, meshes with another bevel gear 247 on the described transversely extending support shaft 248. To permit lateral adjustment, this bevel gear 247 is keyed on the transverse shaft 248 in an axially extending slot.

In order to drive the shaft 248, a sprocket 252 is mounted adjacent one end thereof, as shown best in FIGS. 8 and 9, and an endless chain 253 is trained about this sprocket, a drive sprocket 255 thereunder, on the previously described shaft 204 that supports one end of the woven wire belt conveyor 201, and a pair of intermediate idler sprockets 256, one of which is movably carried on a pivoted arm 257 that is connected to the frame by a tension spring 258, thus enabling the required vertical adjustment of the shaft 248 and the elements supported therefrom. Since the shaft 248 is thus driven from the conveyor shaft 204, the belt conveyor 200 and the carton take-off conveyor 220 partake of correlated motion. Preferably, the connection is such that the horizontal component of motion of the V belts 239, 239' is equivalent to the rectilinear horizontal motion of the upper flight of the woven wire belt 201.

As the loaded carton C supported on its side flaps F3, F4 either in horizontally-projecting or vertically-dependent disposition, as previously described, arrives at the carton unloading section, the sides of the carton are first subjected to the action of the beaters 280. Any tendency for the bottles B or other articles to stick within the carton C is thus overcome and egress of such articles from the carton is initiated prior to engagement of the carton side walls by the carton conveying V-belts 239, 239'.

As the carton C moves past the beaters 280, it is resiliently grasped between the spring-urged longitudinal V-belts 239, 239', the force being sufficient to effect slight inward displacement of the carton sides into pinching or grasping engagement with the contained liner L. Thus, as the carton is carried by the V-belts along an ascending path, the bottles B or other articles which have been previously loosened by the beaters 280 are left on the belt conveyor 200 while the carton C and the liner L are gradually lifted therefrom. Since the bottles B emerge gently and gradually from their compartments within the carton, they are left on the belt conveyor 200 in aligned, oriented disposition in a succession of parallel rows.

After a carton C has been grasped and gradually moved upwardly by the carton take-off conveyor 200, leaving the bottles B in oriented and aligned relation on the woven wire belt conveyor 200 thereunder, the unloaded carton is delivered at the extremity of the projecting arms 221 to the carton reinversion mechanism 282, previously mentioned, which is arranged to effect the return of the inverted carton to an upright disposition and subsequent discharge to a receiving conveyor.

With particular reference to FIGS. 2, 11, and 12, the carton reinversion mechanism 282 is mounted above the carton take-off conveyor 220 so as to receive cartons C in an inverted position from the outer end of such carton take-off conveyor, reinvert the same to an upright disposition and thereafter deliver the same to a suitable receiving conveyor or storage area (not shown). More particularly, as best shown in FIG. 2, the outwardly and forwardly projecting plates 265 which support the outer ends of the arms 221 of the carton take-off conveyor 220 also support at a disposition thereabove parallel frame elements 283 of the carton reinversion mechanism which extend generally horizontally and support therebetween an endless conveyor belt 284, the path of whose upper flight intersects the upwardly inclined path of cartons C at the end of the described carton take-off conveyor 220. The endless belt 284 has a roughened rubber surface so that it may frictionally propel a carton C seated thereon and is trained about two rollers 285, 286 rotatably supported on transversely extending parallel shafts 287, 288 mounted in suitable bearings in the described frame elements at opposite extremities thereof. The lower flight of the belt also passes around an idler roller 289 mounted for horizontal adjustment to provide suitable belt tension and a drive roller 290. The shaft for the drive roller 290 also mounts a pulley 291 about which is trained a V-belt 292 that passes downwardly and around a similar pulley 293 mounted on a shaft 294 mounted on one of the projecting braces 229' of the main apparatus frame. This shaft 294 in turn mounts a suitable sprocket 295 about which is trained a drive chain 296 that passes over another sprocket 297 on the drive shaft 248 for the carton take-off conveyor 220 and two intermediate idler sprockets 298, 299, one of which is spring-urged to provide tension of the sprocket chain 296, but permit the previously described vertical adjustment of the carton take-off conveyor drive. Through the described drive connection, the upper flight of the rubber belt 284 moves at a linear speed from right to left, as viewed in FIG. 2 at a speed which is directly correlated with that of the previously described carton take-off conveyor 220 so that cartons C received from the carton take-off conveyor are moved at sufficient speed by the belt 284 to preclude the possibility of carton accumulation.

In order to deliver cartons from inverted disposition at the end of the carton take-off conveyor 220 onto the described conveyor belt 284, the roller shaft 288 adjacent the end of the carton take-off conveyor projects outwardly from both sides of the parallel frame elements 283 of the carton reinversion mechanism 282 and supports a coil spring 302 thereon adjacent each of its opposite ends, as best shown in FIG. 12. Each coil spring 302 is secured at its outer end to a collar 301 which is adjustably connected by a set screw 300 to the shaft 288 and the inner end of the spring is, in turn, connected to a carton-engaging disk 303. The coil spring not only transfers torque from the shaft 288 to such disk 303, but is under compression so as to urge the disk inwardly against three rollers 304 supported from the frame elements 283 to engage the concave or dished interior of the disk and follow a circumferential path thereon as the disk rotates. By a suitable slotted connection 305, the disposition of the rollers 304 can be adjusted individually outwardly of the frame elements so as to vary the disposition of the plane of the disk rims 303a relative to their driving shaft 288. As best shown in FIG. 12, such adjustment is made so that the rims 303a of the two disks 303 are closest at a point closely adjacent the output end of the carton take-off conveyor 220 and are spaced furthest apart where the disk rims 303a intersect the plane defined by the upper surface of the endless rubber belt 284. More particularly, the spacing between the disk rims 303a is such that a carton C delivered from the end of the carton take-off conveyor 220 is grasped between the rims 303a of the disks and is carried therearound as the supporting shaft 288 rotates to reach eventually an upright disposition as the disks near the upper flight of the rubber belt 284. At this latter point, the disk rims 303a are further spaced and the carton C is released for continued conveyance on the rubber belt 284 from the right to the left, as viewed in FIG. 2.

At the release position, side plates 307, which converge in the direction of carton motion, are mounted on the frame elements 283 to confine the carton side flaps F3, F4 and a deflector 308 is supported between such plates over the disks 303 to engage the top of a carton C and assure its discharge onto the belt 284 in an upright disposition.

Suitable carton guide rails 306 are positioned adjacent the sides of the endless rubber belt 284 so that each carton C is, in turn, moved therealong to the remote end of the upper flight of the rubber belt and is delivered therefrom to a suitable receiving conveyor which is not shown and forms no part of the present invention.

While the empty cartons C have been reinverted and delivered in the manner described to a receiving conveyor, the rows of aligned, oriented bottles B have been moved from the left to the right along the third conveyor 200 to the article regimenting section 50.

ARTICLE REGIMENTING SECTION 50

The article regimenting section 50 is arranged to receive each successive row of bottles B moved from the left to the right along the third conveyor 200 and to move such row substantially transversely of its prior direction of movement so as to establish single-file relationship of the bottles B.

For this purpose, a file conveyor 310 in the form of a flat-top endless chain is arranged in transverse relation to the conveyor belt 201, as best illustrated in FIG. 13. The upper flight of such flat-top endless chain conveyor 310 is in the same plane as the upper flight of the conveyor belt 201 and immediately adjacent its terminus to enable easy transfer of the bottles B or other articles from one to the other. Structurally, the flat-top endless chain conveyor 310 is conventional, being mounted on suitable sprockets (not shown) and preferably driven by an independent variable speed drive unit 311 also of conventional construction so that the details thereof need not be described. Such drive unit is adjusted so that the flat-top chain conveyor 310 moves a distance at least equal to the length of one row of bottles B while the conveyor belt 201 moves the length of a single bottle, thus assuring no accumulation of bottles during the transfer. A deflector rod 312 is adjustably mounted as indicated at 312A to extend along one edge of the third conveyor belt 201 to a point adjacent the intersection of the edges of this belt and the flat-top chain conveyor 310 and thence diagonally across the described flat-top chain conveyor and a second similar flat-top chain conveyor 313 mounted immediately adjacent the first in parallelism therewith. This second flat-top chain conveyor 313 is of substantially identical construction to the first flat-top conveyor 310, but is suitably connected to a separate variable speed drive unit 314 for propulsion at a higher rate of speed for a purpose to be described hereinafter. Over the second flat-top chain conveyor 313, a second rod 315 is supported in spaced relation to the deflector rod 312 so as to extend diagonally, the two rods defining an opening for egress of bottles B from the second flat-top chain conveyor to a suitable receiving conveyor (not shown).

Preferably, a transfer control mechanism such as a rotary indexing row divider, generally indicated at 320 in FIGS. 2 and 13, is disposed above the end of the woven wire conveyor belt 201 and one edge of the transversely directed file conveyor 310 so as to maintain control of the bottles B as they are transferred from the one conveyor to the other and thus assist in providing an orderly regimenting of the bottles B or other articles. The row divider 320 includes a wheel 321 supported at one side of the channel member 60 on a stub shaft 323 which projects transversely of the frame and is mounted in a suitable bearing on a bracket 324 that projects upwardly from its rigid support on such channel member. Eight row dividing rods 326 are secured in circumferentially-spaced relation to the rim of the wheel 321 and project in substantial parallelism completely across the woven wire conveyor belt 201. The mounting of this supporting shaft 323 is such that the lowermost rod 326 on the wheel 321 is at a horizontal level below the middle of a bottle B on the woven wire conveyor belt 201, as best shown in FIG. 14. A star-shaped cam 327 having eight indentations 327a is secured on the rotatably supported shaft 323 and a cam follower 328 in the form of a roller is arranged to rest in one or another of such indentations dependent upon the rotative disposition of the cam. When the cam follower 328 rests in one of such indentations 327a, a respective one of the rods 326 is disposed at its lowermost position so as to engage a bottle B in a position immediately adjacent the exit end of the woven wire belt 201 as clearly illustrated in FIG. 14. The cam follower 328 is rotatably mounted at one side of a bar 329 pivotally secured at its one extremity to a suitable rigid supporting bracket 330. Adjacent its free end, the bar 329 slidably supports a weight 331 having a set screw 332 thereon so that the position of the weight on the bar can be fixed at any desired point. Thus, it will be seen that dependent on the position of this weight 331, the roller or cam follower 328 will be urged downwardly into one indentation 327a of the cam 327 with a predetermined force. Dependent upon this force, a predetermined torque must be exerted against the wheel supported rods 326 to effect rotation of the shaft 323 and the star-shaped cam 327 thereon so as to enable the cam follower 328 to ride over one high point on the cam 327 and drop into the adjacent indentation 327a. Accordingly, in the absence of any externally applied force, one of the rods 326 will automatically assume the lowermost index position illustrated in FIG. 14 adjacent the exit end of the conveyor belt 201. The weight 331 is normally adjusted so that if one bottle B in an advancing row on the conveyor belt 201 is slightly in advance of the remainder in that same row, it will be resiliently impeded and slowed in its direction of motion until the remainder of the bottles in the row can overtake the same. Thereafter, the entire row will be propelled forwardly with the forward edges of the bottles B in engagement with the rod 326 and thus in lateral alignment.

The transfer of the bottles B during their passage through the regimenting section 50 from their parallel row formation to single-file formation can be best described by reference to diagrammatic views, FIGS. 15A, 15B and 15C. In these views, the transfer of "flat" bottles B as shown in FIG. 1 is illustrated, the proper regimentation of such "flat" bottles being generally considered as the most difficult to achieve among bottles of standard shapes.

With initial reference to FIG. 15A, one row of bottles B is being frictionally propelled by the row conveyor belt 210 to a position adjacent the end thereof. One bottle is slightly in advance of the remainder in the row and has come into engagement with a rod 326 at its lowest or index position wherefore such bottle is resiliently impeded since the cam follower 328 rests in one indentation or low point 327a of the star-shaped cam 327. It will be noted that movement of this rod 326 is also resiliently impeded by the preceding row of bottles B on the transverse file conveyor 310, the rearward edges of some of the bottles in this preceding row remaining in contact with the rod 326 as they are moved transversely. Through the described resilient impedance of movement of the rod 326, the single advanced bottle B in the row is slowed so that the other three bottles in the row advance more rapidly wherefore the forward edges of all four bottles come into contact with the rod 326 to achieve a lateral alignment of the entire row.

As the aligned row of bottles B is pushed by the conveyor belt 201 onto the side of the transverse file conveyor 310 and the rod 326 is in turn moved by the advancing row, the forward portion of the bottles is frictionally engaged and propelled transversely so that a turning of these bottles is instigated, as shown in FIG. 15B. The bottle B nearest the curved corner of the deflector rod 312 comes into engagement therewith rapidly and the remaining bottles move in the same general fashion so that as the bottles continue to advance to the right, they also continue to turn in a counterclockwise direction, as viewed in FIG. 15B.

As movement proceeds, said cam follower 328 having left the indentation 327a finally reaches the high point 327b of the cam 327 associated with the rod 326, and this rod thereafter moves forwardly out of impeding engagement with the forward edges of the turning row of bottles B and the succeeding rod 326 comes into engagement with their rearward edges which still lie on the row conveyor belt 201, as shown in FIG. 15C. The speed relation of the conveyors 310 and 201 is such that the preceding row of bottles B on the file conveyor 310 has entirely left engagement with the rod 326 at about the time the high point 327b of the cam 327 is reached so that this preceding row of bottles does not impede the described forward motion of the rod 326 over the file conveyor from the position illustrated in FIG. 15B to that illustrated in FIG. 15C.

In the position illustrated in FIG. 15C, since the high point 327b of the cam 327 has been passed, the second rod 326 is engaging the rear portions of the transferring bottles B and is forcing the same forwardly, and since the bottles have already been partially turned, it assists in further turning thereof, as has been previously mentioned. The impelling force against the rear of the bottles B may be assisted through engagement of the impelling rod 326 by a succeeding row of bottles B on the conveyor belt 201, as shown in FIG. 15C.

As transverse propulsion of the forward portions of the bottles B and forward motion of the rear portions continues, the first bottle in the row moves around the corner of the deflector rod 312 to eventually assume a position flatly thereagainst in close succession to the last bottle B in the previous row, or the relative speeds of the conveyors 201 and 310 may be such that the forward portion of this first bottle comes into overlapping relationship with the rearmost portion of the last bottle in the preceding row of bottles, as illustrated in FIG. 15A. Each of the successive bottles B in the row eventually comes into overlapping relationship with the preceding bottle on the transverse file conveyor 310. It is quite obvious that the dimension of each bottle B is greater along its flat side than in a transverse direction and since the bottles are relatively closely spaced while propelled in the row conveyor belt 201, the described turning of the bottles B will effect the described overlapping disposition of the same, as illustrated.

As the overlapping bottles B are moved by the first file conveyor 310 and are laterally directed by the diagonally-extending deflector rod 312, their forward portions eventually arrive at the second file conveyor 313 whose speed, as previously mentioned, is considerably greater than that of the first file conveyor 310. Thus, as can be best seen by reference to FIG. 15B, the overlapping relationship of the bottles on the first file conveyor 310 is eliminated. Each bottle B, as it moves from the first file conveyor 310 onto the second file conveyor 313, is accelerated and thus withdrawn from engagement with the succeeding bottle which is still on the first file conveyor 310. As the forward portion of that succeeding bottle B no longer engages in the rearward portion of the preceding bottle, such forward portion, which was not against the deflector rod 312, is advanced wherefore a flat engagement against the deflector rod is quickly established. Thus, each bottle B is moved by the second file conveyor 313 in spaced relationship relative to the other bottles and also in precisely oriented relationship, as shown clearly in FIG. 15B and moves from this conveyor 313 onto the receiving conveyor for delivery to the filling machine.

It may be noted that an additional effect will be experienced if rectangular bottles having one side of greater dimension than another were moved from the first file conveyor 310 onto the second file conveyor 313. If one such bottle were moved along the deflector rod 312 with its shorter side lying thereagainst, that portion furthest from the deflector rod would be first engaged by the faster moving file conveyor 313 which would, accordingly, exert a torque on such bottle and effect a turning thereof into a disposition with the longer side against the deflector rod. On the other hand, if the longer side of such rectangular bottle were already in engagement with the deflector rod as it moved on the first file conveyor 310, a position of greater stability is already in existence and the transfer onto the second file conveyor 313 would not effect a turning of the bottle. Thus all of these rectangular bottles would arrive at the exit end of the apparatus in not only single file relation but identical oriented dispositions.

It will be obvious that for bottles of various shapes and sizes, some relative adjustment of the speed of the conveyor belt 201, and the file conveyors 310 and 313 may be necessary to achieve the ultimate result of properly oriented, single-file relationship. However, it has been found that through adjustments of these conveyor speeds and the additional adjustment of the control mechanism 320, desired single-file relationship of any bottles of standard size and shape can be effectively achieved. With regard to the control mechanism 320, it is important to note that its effectiveness of control is dependent upon the proper arrival of the successive rows on the conveyor belt 201 and such arrival is assured by the abutting relationship of the cartons during the unloading operation.

In the event that regular bottles of, for example, cylindrical shape are to be handled, the regimenting of such bottles into single-file relation is considerably simplified, and the described apparatus, in turn, can be simplified. More particularly, as shown in FIGS. 16A and 16B, a row of such cylindrical bottles can be fed directly from the woven wire belt 201 onto a single transversely extending flat-top chain conveyor 310. The row of bottles will move directly onto such transverse flat top chain conveyor 310 and be moved in the transverse direction against the described diagonally extending bottle deflector rod 312 which will somewhat impede the motion of the cylindrical bottle in the direction of propulsion but also will effect a rotative action of these propelled bottles. Thus any bottles which are not properly aligned will be propelled between bottles already against the deflecting rod 312 and thus assume aligned dispositions prior to their discharge from the single flat-top chain conveyor. Consequently, in the case of such cylindrical bottles, the transfer control mechanism 320 as well as the second high speed flat-top chain conveyor 313 can well be eliminated.

Various further modifications and/or alterations in the apparatus as well as the previously described method can be made without departing from the spirit of this invention. Accordingly, the foregoing description of method and apparatus embodying the present invention is to be considered as purely exemplary and not in a limiting sense; the actual scope of the invention is to be indicated by reference to the appended claims.

What is claimed is:

1. A transfer control mechanism comprising a wheel, a plurality of parallel row dividing rods extending from the wheel and being disposed so that an aggregate force exerted by a row of articles against a single rod will cause the wheel to turn, and biasing means operatively connected with the wheel to prevent its turning if less than a predetermined number of articles in the row are simultaneously applying a force to a single rod.

2. A transfer control mechanism comprising a first bracket, a stub shaft carried on the bracket, a wheel mounted on the stub shaft for rotation, a plurality of row dividing rods extending from the wheel near its periphery and parallel to the stub shaft, a cam fixed to the wheel for rotation therewith, a second bracket disposed generally horizontally and supported by the first bracket, a generally pivoting horizontal arm having a pivotal support carried by the second bracket, a cam follower on the arm and engaging the cam, and a weight slidably mounted on the arm between the cam follower and the pivotal support.

References Cited by the Examiner

UNITED STATES PATENTS

| | | | |
|---|---|---|---|
| 1,852,322 | 4/1932 | Loew | 198—34 |
| 2,315,880 | 4/1943 | Stiles | 198—32 |
| 2,560,995 | 7/1951 | Stiles | 198—32 |
| 2,571,790 | 10/1951 | Tomkins | 198—34 |
| 2,775,334 | 12/1956 | Jeremiah | 198—30 |

HUGO O. SCHULZ, *Primary Examiner.*

SAMUEL F. COLEMAN, RALPH E. KRISHER,
*Assistant Examiners.*